United States Patent
Smitherman

[19]

[11] Patent Number: 5,983,616
[45] Date of Patent: Nov. 16, 1999

[54] GARDEN TOOL FOR CUTTING WEEDS AND CULTIVATING SOIL

[76] Inventor: John B. Smitherman, 2021 Edgewood Dr., Danville, Ind. 46122

[21] Appl. No.: 08/984,818

[22] Filed: Dec. 4, 1997

[51] Int. Cl.⁶ ........................................................ A01B 1/06
[52] U.S. Cl. .................................. 56/239; 7/114; 172/17
[58] Field of Search ....................... 56/239, 289, 400.06, 56/400.05; 172/15, 16, 17, 371, 376; 7/114; 30/376, 314

[56] References Cited

U.S. PATENT DOCUMENTS

| D. 262,596 | 1/1982 | Green ............................................ D8/11 |
| 4,483,133 | 11/1984 | Pasley ..................................... 56/400.06 |
| 4,901,801 | 2/1990 | Popivalo .................................. 172/375 |
| 5,003,760 | 4/1991 | Webb ....................................... 56/400.06 |
| 5,287,935 | 2/1994 | Foeller ..................................... 172/136 |
| 5,477,667 | 12/1995 | Bryant .................................... 56/400.06 |

FOREIGN PATENT DOCUMENTS

| 175 249 | 9/1906 | Germany .................................... 7/114 |

*Primary Examiner*—Robert E. Pezzuto
*Attorney, Agent, or Firm*—Woodard, Emhardt, Naughton, Moriarty & McNett Patent and Trademark Attorneys

[57] ABSTRACT

A garden tool comprising a blade having a sharpened edge to cut weeds rooted in an area of soil, and one or more tines, each tine having a pointed tip to cultivate the area of soil. The blade is spaced from one or more wheels of the garden tool to enable the sharpened edge to be inserted into the area of soil in order to cut the rooted weeds as the wheel(s) are traversed over the area of soil via a handle of the garden tool. The tine(s) are spaced from the one or more wheels to enable the pointing tip(s) to be inserted into the area of soil in order to cultivate the area of soil as the wheel(s) are traversed over the area of soil via the handle.

13 Claims, 3 Drawing Sheets

5,983,616

GARDEN TOOL FOR CUTTING WEEDS AND CULTIVATING SOIL

FIELD OF THE INVENTION

The present invention relates to the field of garden tools, and more specifically to a garden tool for cutting weeds and cultivating soil.

BACKGROUND OF THE INVENTION

Presently, the weed cutting and soil cultivation of a garden requires an individual to separately use a cutting tool and a cultivating tool. Consequently, the overall time necessary to cut the weeds and cultivate the soil is increased due to the time it takes to switch between the tools. In addition, the overall time necessary to cut the weeds and cultivate the soil is increased due to the time it takes to ensure the cutting depth is uniform and that the cultivating depth is also uniform.

What is therefore needed is a garden tool that enables one to cut weeds and cultivate soil. What is also needed is a garden tool that provides a uniform cutting depth and a uniform cultivating depth.

SUMMARY OF THE INVENTION

The present invention relates to a garden tool for cutting weeds and cultivating soil that addresses and overcomes the foregoing disadvantages and drawbacks in the separate utilization of a cutting tool and a cultivating tool. Various aspects of the present invention are novel, non-obvious, and provide various advantages. While the actual nature of the present invention described in detail herein can only be determined with reference to the claims appended hereto, certain features which are characteristic of the present invention disclosed herein can be described briefly.

In accordance with the present invention, a garden tool for cutting weeds rooted in an area of soil and cultivating the area of soil comprises a bar, a handle, a wheel, a blade having an edge, and a tine having a tip. The handle, the wheel, the blade and the tine are adjoined to the bar. The edge of the blade is spaced from the wheel whereby the edge of the blade can be inserted into the area of soil to cut the weeds as the handle is used to traverse the wheel over the area of soil. The tip of the tine is also spaced from the wheel whereby the tip of the tine can be inserted into the area of soil to cultivate the area of soil as the handle is used to traverse the wheel over the area of soil.

It is an object of the present invention to provide a garden tool having a cutting element and a cultivating element that can be inserted into an area of soil.

It is another object of the present invention to provide a garden tool having a cutting element that cuts weeds rooted in an area of soil at a uniform depth and a cultivating element that cultivates the area of soil at a uniform depth.

These and other objects as well as advantages of the present invention will become more apparent from the following description of the preferred embodiment.

DESCRIPTION OF THE PREFERRED EMBODIMENT

Figure 1:
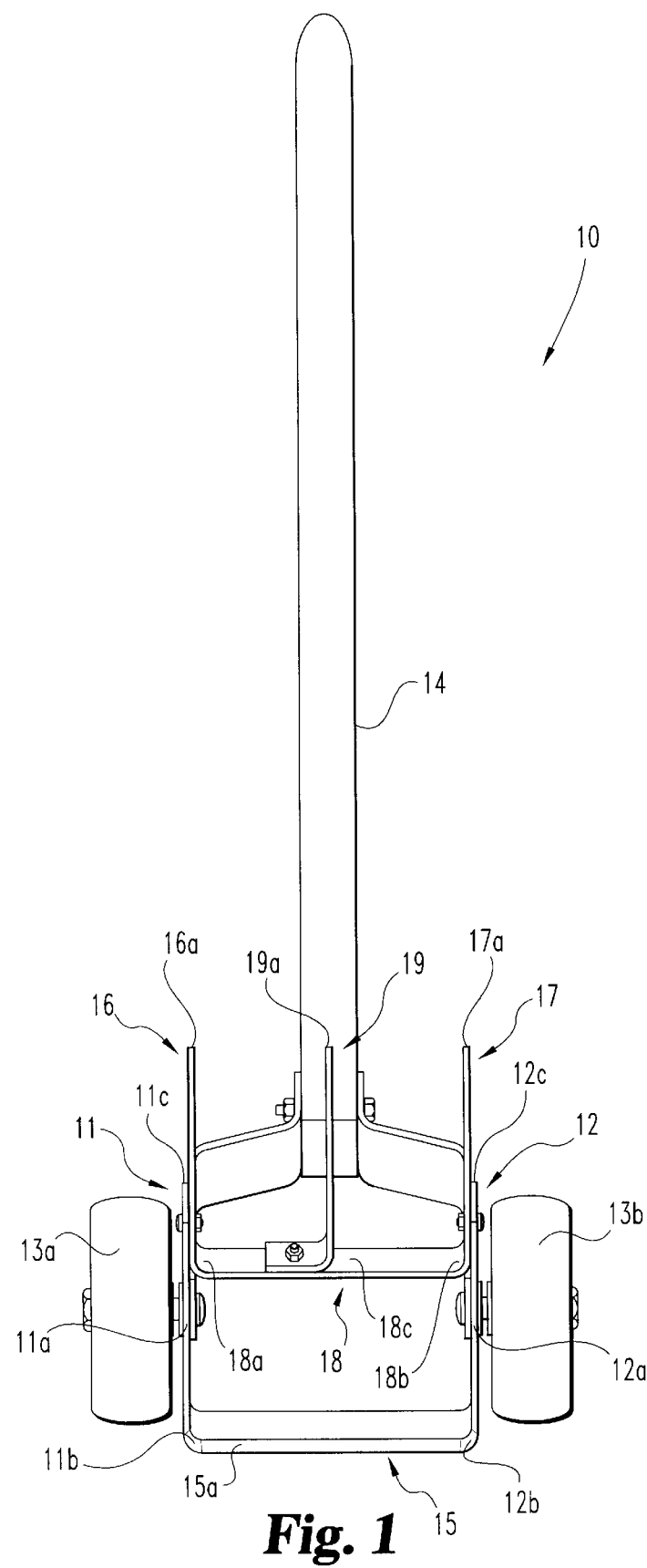
FIG. 1 is a front perspective view of a preferred embodiment of a garden tool for cutting weeds and cultivating soil in accordance with the present invention.

For the purposes of promoting an understanding of the principles of the present invention, reference will now be made to the embodiment illustrated in the drawings and specific language will be used to describe the same. It will nevertheless less be understood that no limitation of the scope of the present invention is thereby intended, such alterations and further modifications in the illustrated device, and such further applications of the principles of the present invention as illustrated therein being contemplated as would normally occur to one skilled in the art to which the present invention relates.

Figure 2:
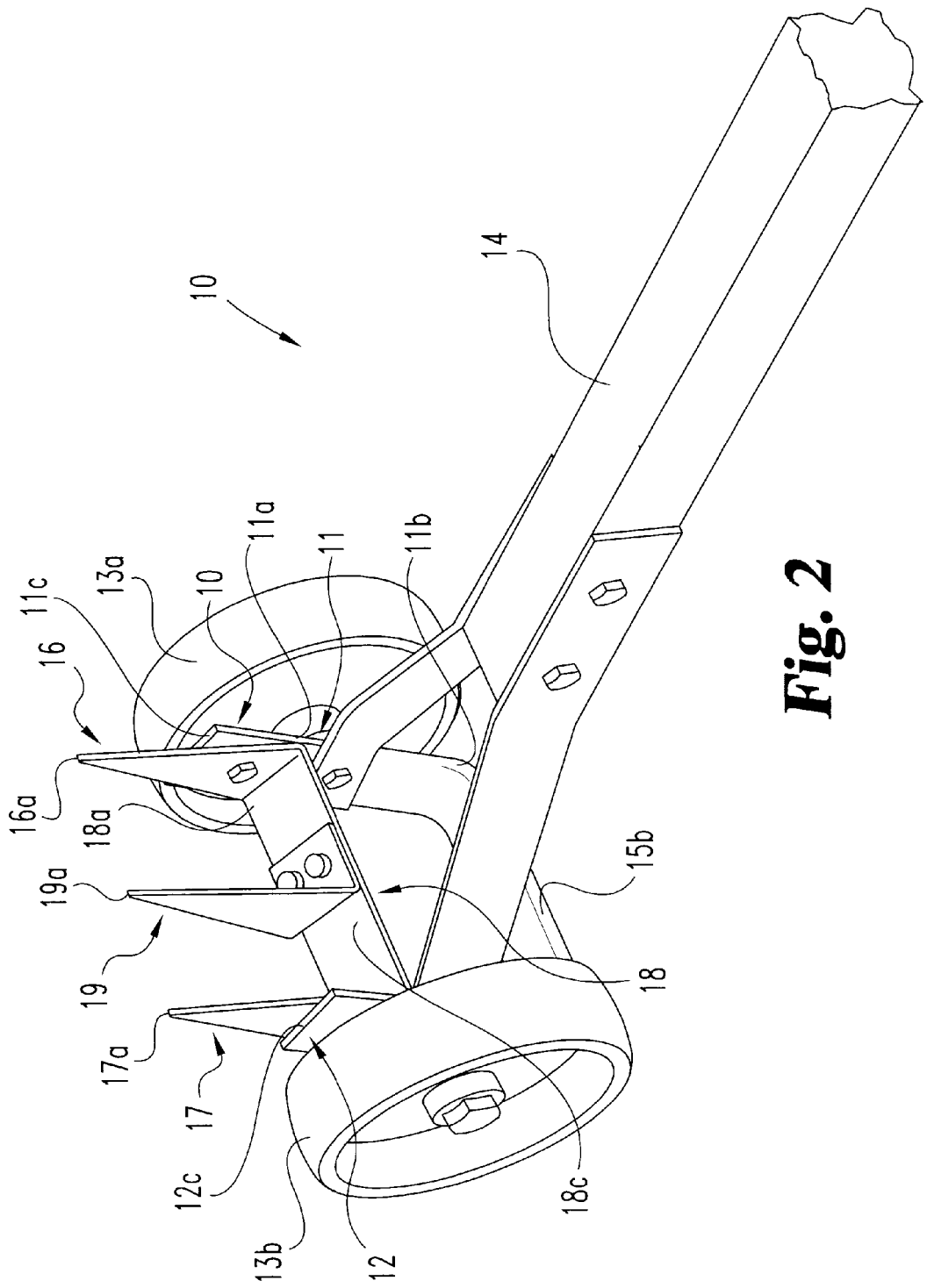
FIG. 2 is a side perspective view of the garden tool in FIG. 1.

FIGS. 1 and 2 are a front perspective view and a side perspective view, respectively, of a preferred embodiment of a garden tool 10 in accordance with the present invention. Referring to FIGS. 1 and 2, garden tool 10 comprises a first bar 11 and a second bar 12. The present invention contemplates that first bar 11 and second bar 12 can be made any material, and can have any configuration and dimensions. Preferably, first bar 11 and second bar 12 are made from steel, and have rectangular prismatical configurations with the same dimensions.

Still referring to FIGS. 1 and 2, garden tool 10 further comprises a wheel 13a adjoined to first bar 11, wheel 13b adjoined to second bar 12, and a handle 14 adjoined to both first bar 11 and second bar 12. For purposes of the present invention, the term adjoined is broadly defined as an unitary fabrication a permanent affixation or a detachable coupling (as shown in FIGS. 1 and 2) of wheel 13a to first bar 11, of wheel 13b to second bar 12, and of handle 14 to both first bar 11 and second bar 12. The present invention contemplates that first wheel 13a and second wheel 13b can be made from any material, and can vary in diameter. The present invention further contemplates that first wheel 13a can be adjoined to any portion of first bar 11 and that second wheel 13b can be adjoined to any portion of second bar 12. Preferably, both first wheel 13a and second wheel 13b are made from rubber, and have a diameter that is less than the length of first bar 11 and second bar 12. In addition, it is preferred that first wheel 13a is adjoined to a middle portion 11a of first bar 11 and that second wheel 13b is adjoined to a middle portion 12a of second bar 12. The present invention contemplates that handle 14 can be made from any material, can vary in dimensions, and can be adjoined to any portion of first bar 11 and second bar 12. Preferably, handle 14 is made from wood, is sufficiently elongated to enable a person of average height to stand while utilizing garden tool 10, and is adjoined to middle portion 11a of first bar 11 and to middle portion 12a of second bar 12. It is also preferred that handle 14 extends away from a first end portion 11b of first bar 11 and an a first end portion 12b of second bar 12.

Figure 3:
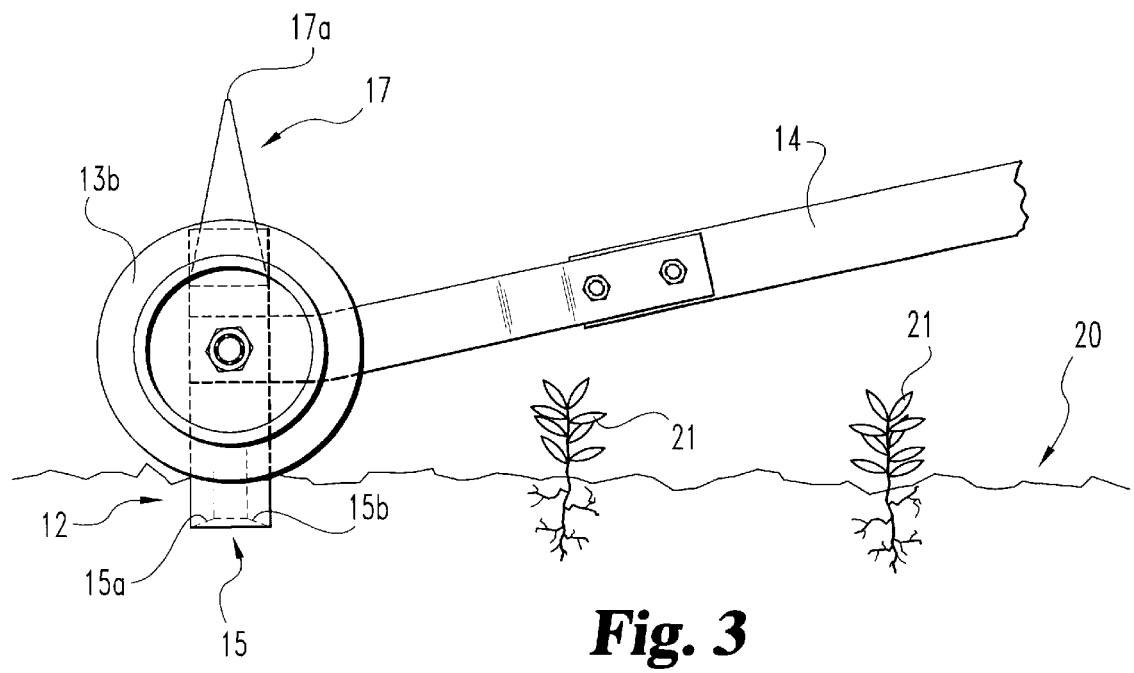
FIG. 3 is a side view of a blade of the garden tool in FIG. 1 inserted into an area of soil.

Still referring to FIGS. 1 and 2, garden tool 10 further comprises a blade 15 adjoined to first bar 11 and second bar 12. For purposes of the present invention, the term adjoined is broadly defined as an unitary fabrication (as shown in FIGS. 1 and 2), a permanent affixation, or a detachable coupling of blade 15 to first bar 11 and second bar 12. The present invention contemplates that blade 15 can be made from any material, can vary in configuration and dimensions, can have one or more sharpened edges to cut weeds, and can be adjoined to any portion of first bar 11 and second bar 12 that spaces the sharpened edges from first wheel 13a and second wheel 13b. Preferably, blade 15 is made from steel, and has a rectangular prismatical configuration having a first edge 15a adjoined to first end portion 11b of first bar 11 and to first end portion 12b of second bar 12 to space first edge 15a from first wheel 13a and from second wheel 13b. It is also preferred that blade 15 further has a second edge 15b diametrically opposing first edge 15a that is also adjoined to first end portion 11b of first bar 11 and to first end portion 12b of second bar 12 to space second edge 15b from first wheel 13a and from second wheel 13b. In addition, it is preferred that first edge 15a and second edge 15b are both substantially perpendicular to first bar 11 and second bar 12. It is to be appreciated and understood that, as illustrated in FIG. 3, the spacing of first edge 15a and second edge 15b from first wheel 13a and second wheel 13b enables a user of garden tool 10 to insert first edge 15a and second edge 15b into an area of soil 20 to cut one or more weeds 21 at a uniform depth as the user utilizes handle 14 to traverse first wheel 13a and second wheel 13b over area of soil 20.

Figure 4:
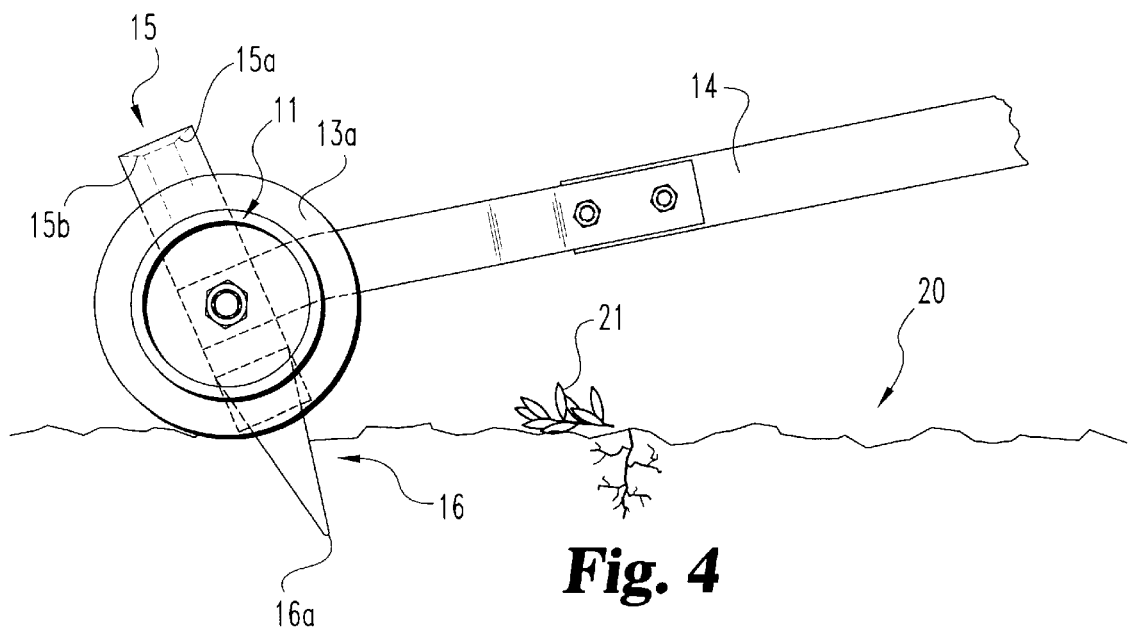
FIG. 4 is a side view of a tine of the garden tool in FIG. 1 inserted into an area of soil.

Referring again to FIGS. 1 and 2, garden tool 10 further comprises a first tine 16 adjoined to first bar 11 and a second tine 17 adjoined to second bar 12. For purposes of the present invention, the term adjoined is broadly defined as an unitary fabrication a permanent affixation, or a detachable coupling (as shown in FIGS. 1 and 2) of first tine 16 to first bar 11, and of second tine 17 to second bar 12. The present invention contemplates that first tine 16 and second tine 17 can be made from any material, can vary in configuration and dimensions, and can have one or more pointed tips. The present invention further contemplates that first tine 16 can be adjoined to any portion of first bar 11 that spaces the pointed tips of first tine 16 from first wheel 13a and that second tine 17 can be adjoined to any portion of second bar 12 that spaces the pointed tip(s) of second tine 17 away from second wheel 13b. Preferably both first tine 16 and second tine 17 are made from steel, have triangular prismatical configurations with the same dimension, and have a tip 16a and a tip 17a, respectively. It is also preferred that tine 16 is adjoined to a second end portion 11c of first bar 11 to space tip 16a from first wheel 13a, and that tine 17 is adjoined to a second end portion 12c of second bar 12 to space tip 17a from second wheel 13b. In addition, it is preferred that tip 16a and tip 17a are spaced an equal distance from first wheel 13a and second wheel 13b, respectively, and that tip 16a and tip 17a are substantially perpendicular to first edge 15a and second edge 15b. It is to be appreciated and understood that, as illustrated in FIG. 4, the spacing of tip 16a from first wheel 13a and the spacing of tip 17a from second wheel 13b enables a user of garden tool 10 to insert tip 16a and tip 17a into area of soil 20 to cultivate area of soil 20 at a uniform depth as the user utilizes handle 14 to traverse first wheel 13a and second wheel 13b over area of soil 20.

Referring again to FIGS. 1 and 2, garden tool 10 further comprises a third bar 18 and a third tine 19 adjoined to third bar 18. For purposes of the present invention, the term adjoined is broadly defined as an unitary fabrication, a permanent affixation, or a detachable coupling (as shown in FIGS. 1 and 2) of third tine 19 to third bar 18. The present invention contemplates that third bar 18 can be made any material, and can have any configuration and dimensions. The present invention further contemplates that third bar 18 can be adjoined to either first bar 11, second bar 12, first tine 16 and/or second tine 17. Preferably, third bar 18 is made from steel, and has a rectangular prismatical configuration with approximately the same length as blade 15. In addition it is preferred that third bar 18 has a first end portion 18a adjoined to first tine 16 and a second end portion 18b adjoined to second tine 17. For purposes of the present invention, the term adjoined is broadly defined as an unitary fabrication (as shown in FIG. 1), a permanent affixation or a detachable coupling of first end portion 18a to first tine 16 and second end portion 18b to second tine 17. The present invention contemplates that third tine 19 can be made from any material, can vary in configuration and dimensions, and can have one or more pointed tips. The present invention further contemplates that third tine 19 can be adjoined to any portion of third bar 18 that extends at least one pointed tip of third tine 19 a distance from third bar 18 that is equal to the distance that tip 16a of first tine 16 extends away from third bar 18. Preferably, third tine 19 is made from steel, has a triangular prismatical configuration having the same dimensions as first tine 16 and second tine 17, and has a tip 19a adjoined to a middle portion 18c of third bar 18 that extends a distance from third bar 18 that is equal to the distance that tip 16a extends away from third bar 18. It is to be appreciated and understood that tip 16a, tip 17a and tip 19a can be inserted into area of soil 20 to cultivate area of soil 20 at a uniform depth as the user utilizes handle 14 to traverse first wheel 13a and second wheel 13b over area of soil 20.

While the present invention has been illustrated and described in detail in the drawings and foregoing description, the same is to be considered as illustrative and not restrictive in character, it being understood that the preferred embodiment has been shown and described and that all changes and modifications that come within the spirit of the present invention are desired to be protected.

What is claimed is:

1. A garden tool for cutting at least one weed rooted in an area of soil, and for cultivating the area of soil, said garden tool comprising:

a first bar;

a first wheel adjoined to said first bar;

a second bar;

a second wheel adjoined to said second bar;

a handle adjoined to said first bar and said second bar;

a blade adjoined to said first bar and said second bar, said blade having an edge spaced from said first wheel and from said second wheel whereby said edge can be inserted into the area of soil to thereby cut the at least one weed as said handle is utilized to traverse said first wheel and said second wheel over the area of soil;

a first tine adjoined to said first bar, said first tine having a tip spaced from said first wheel and said second wheel whereby said tip of said first tine can be inserted into the area of soil to thereby cultivate that area of soil as said handle is utilized to traverse said first wheel and said second wheel over the area of soil; and a second tine adjoined to said second bar, said second tine having a tip spaced from said first wheel and said second wheel whereby said tip of said second tine can be inserted into the area of soil to thereby cultivate that area of soil as said handle is utilized to traverse said first wheel and said second wheel over the area of soil.

2. The garden tool of claim 1 wherein said first bar has a middle portion, and a first end portion adjacent said middle portion;

wherein said first wheel is adjoined to said middle portion of said first bar; and wherein said blade is adjoined to said first end portion of said first bar.

3. The garden tool of claim 1 wherein said first bar has a middle portion, and a first end portion adjacent said middle portion;

wherein said first wheel is adjoined to said middle portion of said first bar; and wherein said first tine is adjoined to said first end portion of said first bar.

4. The garden tool of claim 1 wherein said first bar has a first end portion, a second end portion, and a middle portion disposed between said first end portion and said second end portion;

wherein said first wheel is adjoined to said middle portion of said first bar;

wherein said blade is adjoined to said first end portion of said first bar; and wherein said first tine is adjoined to said second end portion of said first bar.

5. The garden tool of claim 1, 2, 3 or 4 wherein said second bar has a middle portion, and a first end portion adjacent said middle portion;

wherein said second wheel is adjoined to said middle portion of said second bar; and wherein said blade is adjoined to said first end portion of said second bar.

6. The garden tool of claim 1, 2, 3 or 4 wherein said second bar has a middle portion, and a first end portion adjacent said middle portion;

wherein said second wheel is adjoined to said middle portion of said second bar; and wherein said second tine is adjoined to said first end portion of said second bar.

7. The garden tool of claim 1, 2, 3 or 4 wherein said second bar has a first end portion, a second end portion, and a middle portion disposed between said first end portion and said second end portion;

wherein said second wheel is adjoined to said middle portion of said second bar;

wherein said blade is adjoined to said first end portion of said second bar; and wherein said second tine is adjoined to said second end portion of said second bar.

8. The garden tool of claim 1 wherein said tip of said first tine is substantially perpendicular to said edge of said blade.

9. The garden tool of claim 1 wherein said tip of said first tine is substantially perpendicular to said edge of said blade, and said tip of said second tine is substantially perpendicular to said edge of said blade.

10. The garden tool of claim 1 further comprising:

a third bar adjoined to said first tine, wherein said tip of said first tine is spaced from said third bar; and a third tine adjoined to said third bar, said third tine having a tip spaced from said first wheel and from said second wheel whereby said tip of said third tine can be inserted into the area of soil to thereby cultivate the soil as said handle is utilized to traverse said first wheel and said second wheel over the area of soil.

11. The garden tool of claim 10 wherein said third bar has a first end portion, a second end portion, and a middle portion disposed between said first end portion and said second end portion;

wherein said first tine is adjoined to said first end portion of said third bar;

wherein said second tine is adjoined to said second end portion of said third bar;

wherein said tip of said second time is spaced from said third bar; and wherein said third tine is adjoined to said middle portion of said third bar.

12. The garden tool of claim 1 further comprising:

a third bar adjoined to said first bar; and a third tine adjoined to said third bar, said third tine having a tip spaced from said first wheel and from said second wheel whereby said tip of said third tine can be inserted into the area of soil to thereby cultivate the soil as said handle is utilized to traverse said first wheel and said second wheel over the area of soil.

13. The garden tool of claim 12 wherein said third bar has a first end portion, a second end portion, and a middle portion disposed between said first end portion and said second end portion;

wherein said first tine is adjacent said first end portion of said third bar;

wherein said second tine is adjacent said second end portion of said third bar; and wherein said third tine is adjoined to said middle portion of said third bar.

* * * * *